United States Patent [19]

Goto

[11] Patent Number: 4,643,565

[45] Date of Patent: Feb. 17, 1987

[54] INSPECTION DEVICE FOR HIGH-SPEED PRINTS

[75] Inventor: Tadashi Goto, Yokohama, Japan

[73] Assignee: Kabushiki-Kaisha Goko Eizo-Kagaku Kenkyujo, Yokohama, Japan

[21] Appl. No.: 622,553

[22] Filed: Jun. 20, 1984

[30] Foreign Application Priority Data

Jun. 24, 1983 [JP] Japan .................. 58-113878

[51] Int. Cl.$^4$ .................. G01P 3/40; G01N 21/86
[52] U.S. Cl. .................. 356/24; 356/429
[58] Field of Search .................. 356/24, 429–430; 250/571–572; 350/6.4, 500; 352/116, 117

[56] References Cited

U.S. PATENT DOCUMENTS

| | | | |
|---|---|---|---|
| 1,974,573 | 9/1934 | Leventhal | 352/116 |
| 2,140,402 | 12/1938 | Horton | 356/24 X |
| 2,155,013 | 4/1939 | Horton | 356/24 |
| 2,288,079 | 6/1942 | Fitz | 356/116 |
| 2,463,016 | 3/1949 | Briskin et al. | 352/116 |
| 2,817,995 | 12/1957 | Kirkham | 352/117 |
| 3,451,750 | 6/1969 | Wells et al. | 352/117 |
| 3,761,178 | 9/1973 | Turner et al. | 356/24 |

FOREIGN PATENT DOCUMENTS 0649341 1/1951 United Kingdom .................. 356/24

*Primary Examiner*—Vincent P. McGraw
*Attorney, Agent, or Firm*—Shlesinger Fitzsimmons & Shlesinger

[57] ABSTRACT

An inspection device for detecting faulty prints on a printed matter running at a high speed. The prints on the printed matter are held as if they were stopped on account of the employment of an even-numbered polygonal prism which rotates in synchronism with the running speed of the printed matter and which allows an inspector's eye to catch successively the prints on an optical axis not only at their positions on said optical axis but also at their moving positions before and behind said optical axis.

3 Claims, 6 Drawing Figures

INSPECTION DEVICE FOR HIGH-SPEED PRINTS

BACKGROUND AND BRIEF SUMMARY OF THE INVENTION

This invention relates to an inspection device for high-speed prints.

In producing prints by a high-speed printing machine which runs often as fast as 150 meters per minute, faulty prints of several hundred meters break out in a few minute if a shear or omission in printing is not corrected at once. However, it is nearly impossible to find out with the unaided eye such faulty prints as they move too fast.

This invention is, therefore, to provide an inspection device for high-speed prints of a repeated identical pattern with a predetermined distance therebetween, by which device one can accurately and readily inspect each moving print as if it stopped momentarily, whereby a faulty print is checked at once when it breaks out, and steps for preventing the production of succeeding faulty prints can quickly be taken without producing a run of them.

A device made in accordance with this invention is described hereunder more in detail with reference to the accompanying drawing.

DETAILED DESCRIPTION OF EMBODIMENTS

Figure 1:
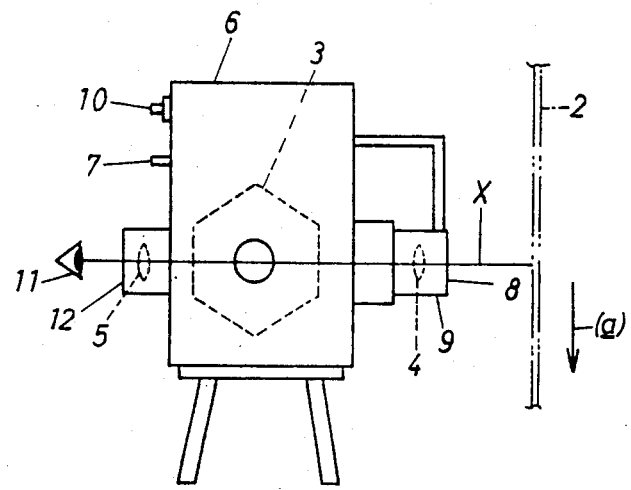
FIG. 1 is an explanatory side view of the inspection device for high-speed prints.
Figure 2:
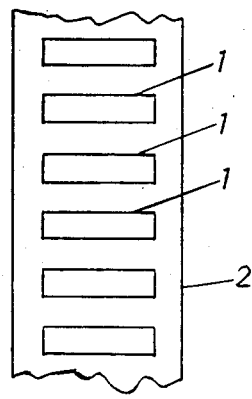
FIG. 2 is an explanatory plan view of a series of prints.

As illustrated in FIG. 1, in a device housing 6, there is mounted an even-numbered polygonal prism 3 such as a regular hexagonal prism as illustrated in the drawing. The longitudinal axis or center O of the prism 3 lies horizontaly in the housing. The prism is mounted rotatably about an axis which extends transversely at a right angle with an optical axis X, and which passes coaxially through the center O thereof. A rotating speed of the prism by a driving means (not shown) is variable by a speed adjusting knob 7. To the front side of housing 6, there is mounted a movable frame 9 which mounts in turn therein an object lens 4, the center of which is in line with the optical axis X passing through the center O of the regular hexagonal prism 3. Numeral 8 indicates a front window of the frame 9. The operation of another knob 10 makes the frame 9 move to the left and right in the drawing so that the object lens moves along the optical axis X. There is mounted at the rear side of housing 6, a tubular window 12 for an eye 11. The window is provided inside thereof with an occular or eye lens, the center of which is in line with the optical axis X.

Numeral 2 indicates a printed matter on which a series of prints 1 of a same pattern with predetermined distances therebetween have been printed by a high-speed printing machine running at a speed as high as 150 m per minute. As illustrated in FIG. 1, the printed matter 2 running at a high speed in the direction a is placed so as to be transverse at a right angle with the optical axis X, whereby each print 1 on the printed matter 2 is observed in order through the window 12 as if it stops momentarily. This is on account of the following working principle.

Figure 3:
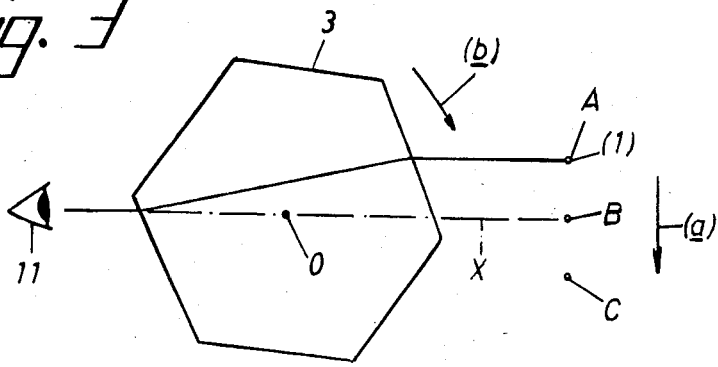
FIGS. 3 to 5 are views explaining the working principle of this invention.
Figure 4:
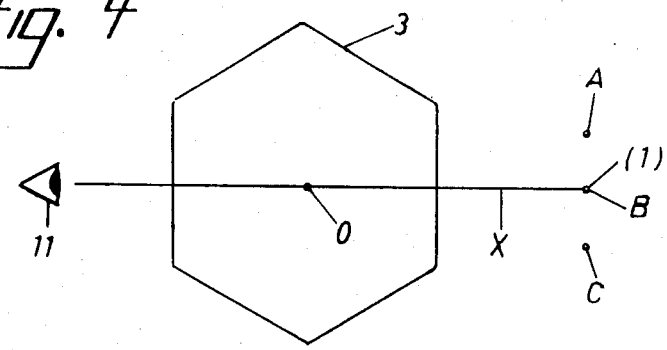
Figure 5:
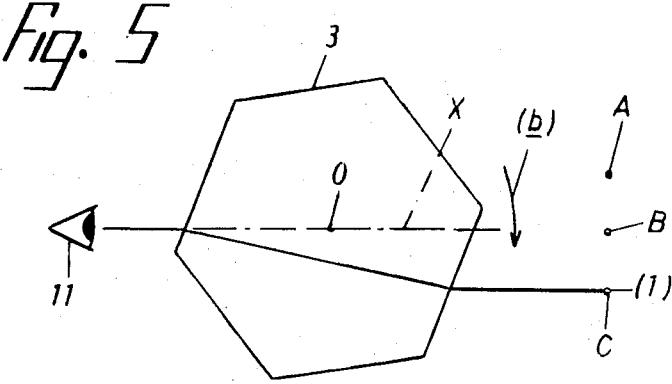

In FIGS. 3 to 5, when a velocity of the hexagonal prism 3 rotating in the direction b is synchronized by means of the speed adjusting knob, to the moving speed of printed matter 2, one of the prints 1 at a position A comes first into sight being refracted by the prism 3 (FIG. 3). Subsequently to this, said same print which has been moved to a position B comes into sight, being along the optical axis X (FIG. 4), and then said print comes into sight at a position C where it is also being refracted by the prism (FIG. 5). Therefore, said one of prints 1 is perceived by the eye 11 as if it were stopped momentarily, though it moved from the A position to the C position via B position.

Figure 6:
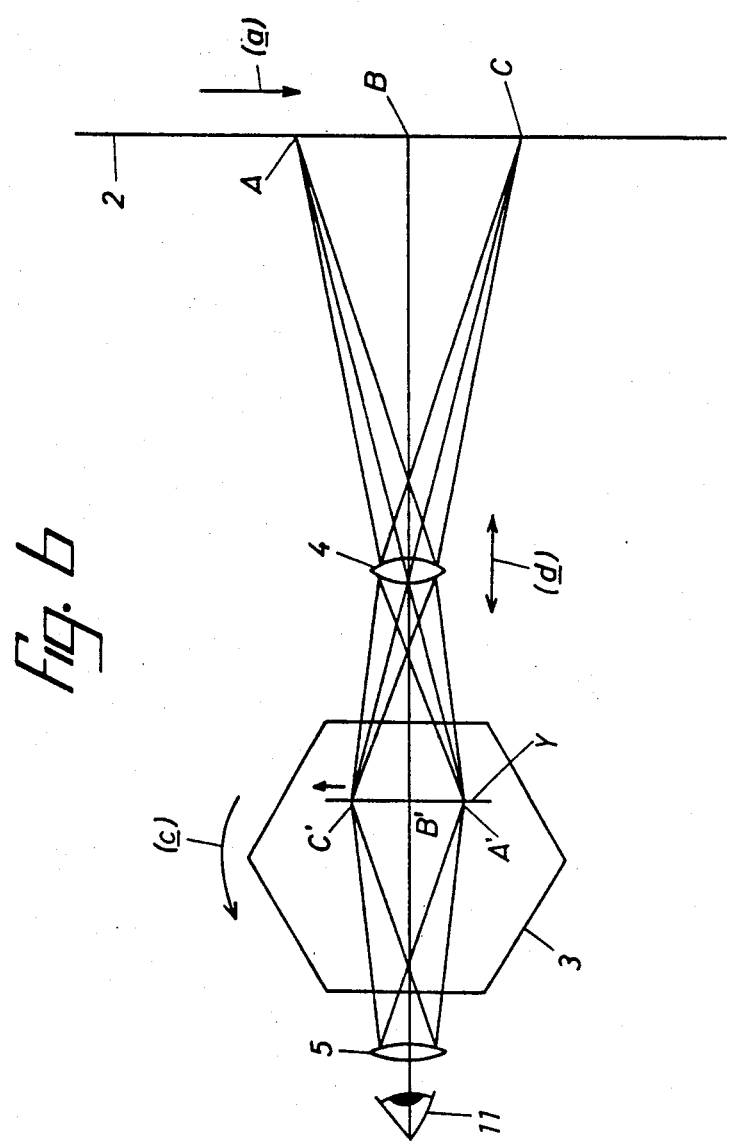
FIG. 6 is a view similar to FIGS. 3 to 5, illustrating more concretely the embodiment of this invention, in which an object lens and eye lens are employed.

The above described working principle of this invention is employed more advantageously in the embodiment shown in FIG. 6. In FIG. 6, when one of the prints 1 on the printed matter 2 moves in the direction a from the A position to the B position, and then to the C position, its image which has been reduced by the object lens 4 moves from a position A' to position C' via position B' on a plane Y. When the prism 3 of a size most appropriate to the reduced image is rotated in the direction C in synchronism with the flow speed of the printed matter 2, the image on the plane Y which has been enlarged by the eye lens 5 can be observed as if it were stopped. Images which appear one after the other exactly overlap one another, whereby they can be observed as a single image as if it were stopped. Therefore, one can efficiently inspect the prints 1 in their particulars, whereby he can check out even minute faulty prints.

It shall be noted that since a size of an image of the pattern 1 which is focused on the plane Y and dimensions of the prism 3 are correlated with each other, some arrangements have to be made so that a predetermined size of the image on the plane Y is obtainable irrespectively of a size of the pattern 1 and without changing the prism 3 to larger or smaller one. In this invention, when a comparatively larger size of the printed pattern 1 is to be inspected, said pattern can be focused as the predetermined size of image on the plane Y simply by moving the object lens 4 through the adjusting knob 10 further from the printed matter 2. Likewise, the object lens shall be moved nearer to the printed matter when a comparatively smaller size of pattern 1 is to be inspected. In place of the object lens 4 which is movable against the printed matter, a zoom lens may be employed.

I claim:

1. An inspection device for prints traveling at high-speed, comprising; a housing having an optical axis;

means mounting said housing adjacent a plane in which a plurality of like prints are fed successively and one after another, at high speed in one direction past said housing, and at right angles to said optical axis, an even-numbered polygonal prism mounted in the housing so as to rotate about an axis extending at a right angle to said optical axis and passing coaxially through a longitudinal central axis of the prism, means for projecting images of said prints through a front window which is provided in the housing at the side thereof confronting said plane in which said prints travel, and to the eye of an observer through a further window provided in the housing oppositely to said front window, and which windows lie on said optical axis;

said polygonal prism being rotatable in a direction opposite to said one direction, and means on said housing operable to cause said prism to be rotated at a speed synchronized with the running speed of the prints which travel at a right angle to said optical axis, thereby to cause stationary superimposed images of said prints to be projected to the eye of said observer.

2. An inspection device for high-speed prints as claimed in claim 1, in which said projecting means comprises an eye lens provided in said other window, and an object lens provided in said front window so as to be adjustably movable toward and away from the high-speed prints.

3. An inspection device for high-speed prints as claimed in claim 2, in which said object lens is a zoom lens.

* * * * *